(12) United States Patent
Sung et al.

(10) Patent No.: US 10,137,532 B2
(45) Date of Patent: Nov. 27, 2018

(54) SUBSTRATE CUTTING APPARATUS AND METHOD OF MANUFACTURING DISPLAY APPARATUS BY USING A SUBSTRATE CUTTING APPARATUS

(71) Applicant: Samsung Display Co., Ltd., Yongin, Gyeonggi-Do (KR)

(72) Inventors: Tae-Hyun Sung, Yongin (KR); Hyun-Gu Lee, Yongin (KR); Young-Gu Kim, Yongin (KR); Jeong-Il Oh, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 615 days.

(21) Appl. No.: 14/330,421

(22) Filed: Jul. 14, 2014

(65) Prior Publication Data

US 2015/0239066 A1 Aug. 27, 2015

(30) Foreign Application Priority Data

Feb. 27, 2014 (KR) .................. 10-2014-0023501

(51) Int. Cl.
*B23K 26/40* (2014.01)
*B23K 26/06* (2014.01)
*B23K 26/38* (2014.01)
*B23K 103/16* (2006.01)

(52) U.S. Cl.
CPC .......... *B23K 26/40* (2013.01); *B23K 26/0613* (2013.01); *B23K 26/38* (2013.01); *B23K 2203/172* (2015.10)

(58) Field of Classification Search
CPC .... B23K 26/40; B23K 26/0613; B23K 26/38; B23K 2203/172
See application file for complete search history.

(56) References Cited

U.S. PATENT DOCUMENTS

| 8,383,983 | B2 | 2/2013 | Lee et al. |
| 2006/0279679 | A1* | 12/2006 | Fujisawa ............ G02B 5/0221 349/116 |
| 2007/0272666 | A1 | 11/2007 | O'Brien et al. |
| 2013/0264730 | A1 | 10/2013 | Wu et al. |

FOREIGN PATENT DOCUMENTS

| JP | 2013-229427 | 11/2013 |
| KR | 10-2010-0107252 | 10/2010 |

* cited by examiner

*Primary Examiner* — Robert J Grun
(74) *Attorney, Agent, or Firm* — H.C. Park & Associates, PLC

(57) ABSTRACT

A substrate cutting apparatus and a method of manufacturing a display apparatus by using the substrate cutting apparatus, so that an occurrence of an error in cutting a substrate may be prevented and the substrate may be exactly cut. The substrate cutting apparatus includes an integrated laser beam oscillator where an infrared wavelength laser beam oscillator and a short pulse laser beam oscillator are adjacent to each other and are fixed; a stage on which a substrate is disposed; and a transfer unit that transfers at least one of the substrate and the integrated laser beam oscillator so as to control a short pulse laser beam to be irradiated on a region of the substrate, on which an infrared wavelength laser beam emitted from the integrated laser beam oscillator has just been irradiated.

15 Claims, 2 Drawing Sheets

SUBSTRATE CUTTING APPARATUS AND METHOD OF MANUFACTURING DISPLAY APPARATUS BY USING A SUBSTRATE CUTTING APPARATUS

CLAIM PRIORITY

This application makes reference to, incorporates the same herein, and claims all benefits accruing under 35 U.S.C. § 119 from an application earlier filed in the Korean Intellectual Property Office on 27 Feb. 2014 and there duly assigned Serial No. 10-2014-0023501.

BACKGROUND

1. Field

One or more embodiments of the present invention relate to a method of manufacturing a display apparatus, and more particularly, to a substrate cutting apparatus and a method of manufacturing a display apparatus by using the substrate cutting apparatus.

2. Description of the Related Art

During a display apparatus manufacturing method, a display unit is formed on a substrate and then the substrate is cut. In particular, when small display apparatuses are manufactured, a plurality of display units are formed on one substrate, and regions between the display units on the one substrate are cut, so that the small display apparatuses are simultaneously formed.

However, according to a method of manufacturing a display apparatus by using a substrate cutting apparatus according to the related art, a substrate is damaged while the substrate is cut, and thus, the display apparatus becomes defective.

The above information disclosed in this Related Art section is only for enhancement of understanding of the background of the invention and therefore it may contain information that does not form the prior art that is already known to a person of ordinary skill in the art.

SUMMARY

One or more embodiments of the present invention include a substrate cutting apparatus and a method of manufacturing a display apparatus by using the substrate cutting apparatus, so that an occurrence of an error in cutting a substrate may be prevented and the substrate may be exactly cut.

Additional aspects will be set forth in part in the description which follows and, in part, will be apparent from the description, or may be learned by practice of the presented embodiments.

According to one or more embodiments of the present invention, a substrate cutting apparatus includes an integrated laser beam oscillator where an infrared wavelength laser beam oscillator and a short pulse laser beam oscillator are adjacent to each other and are fixed, a stage on which a substrate is disposed, and a transfer unit that transfers at least one of the substrate and the integrated laser beam oscillator so as to control a short pulse laser beam to be irradiated on a region of the substrate on which an infrared wavelength laser beam emitted from the integrated laser beam oscillator has been just irradiated.

The infrared wavelength laser beam oscillator may include a carbon dioxide laser beam oscillator.

The short pulse laser beam oscillator may include a femtosecond laser beam oscillator or a picosecond laser beam oscillator.

The stage may support the substrate that is a stack including first through third layers, wherein the first layer and the third layer may include polyethylene terephthalate, and the second layer between the first layer and the third layer may include polyimide.

The infrared wavelength laser beam oscillator may emit a laser beam to be incident on one of the first layer and the third layer, and the short pulse laser beam oscillator may emit another laser beam to be incident on the other one of the first layer and the third layer, and the second layer.

According to one or more embodiments of the present invention, a method of manufacturing a display apparatus includes operations of forming a display device on a substrate; and cutting the substrate by irradiating a laser beam on the substrate, wherein the cutting includes operations of irradiating an infrared wavelength laser beam on the substrate; and irradiating a short pulse laser beam on a region of the substrate, on which the infrared wavelength laser beam has just been irradiated.

The operation of cutting may be performed by using an integrated laser beam oscillator where an infrared wavelength laser beam oscillator and a short pulse laser beam oscillator are adjacent to each other and are fixed.

The operation of irradiating the infrared wavelength laser beam may include an operation of irradiating a carbon dioxide laser beam.

The operation of irradiating the short pulse laser beam may include an operation of irradiating a femtosecond laser beam or a picosecond laser beam.

In the operation of forming the display device, the display device may be formed on the substrate that is a stack including a first layer, a second layer, and a third layer, wherein the first layer and the third layer include polyethylene terephthalate, and the second layer includes polyimide and is between the first layer and the third layer.

The operation of irradiating the infrared wavelength laser beam may include an operation of irradiating the infrared wavelength laser beam on one of the first layer and the third layer of the substrate, and the operation of irradiating the short pulse laser beam may include an operation of irradiating the short pulse laser beam on the other one of the first layer and the third layer of the substrate, and the second layer.

In the operation of forming the display device, the display device may be formed on a plurality of display regions on the substrate, and in the operation of cutting the substrate by irradiating the laser beam, the laser beam may be irradiated on regions between the plurality of display regions and thus the substrate may be cut.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION

Figure 1:
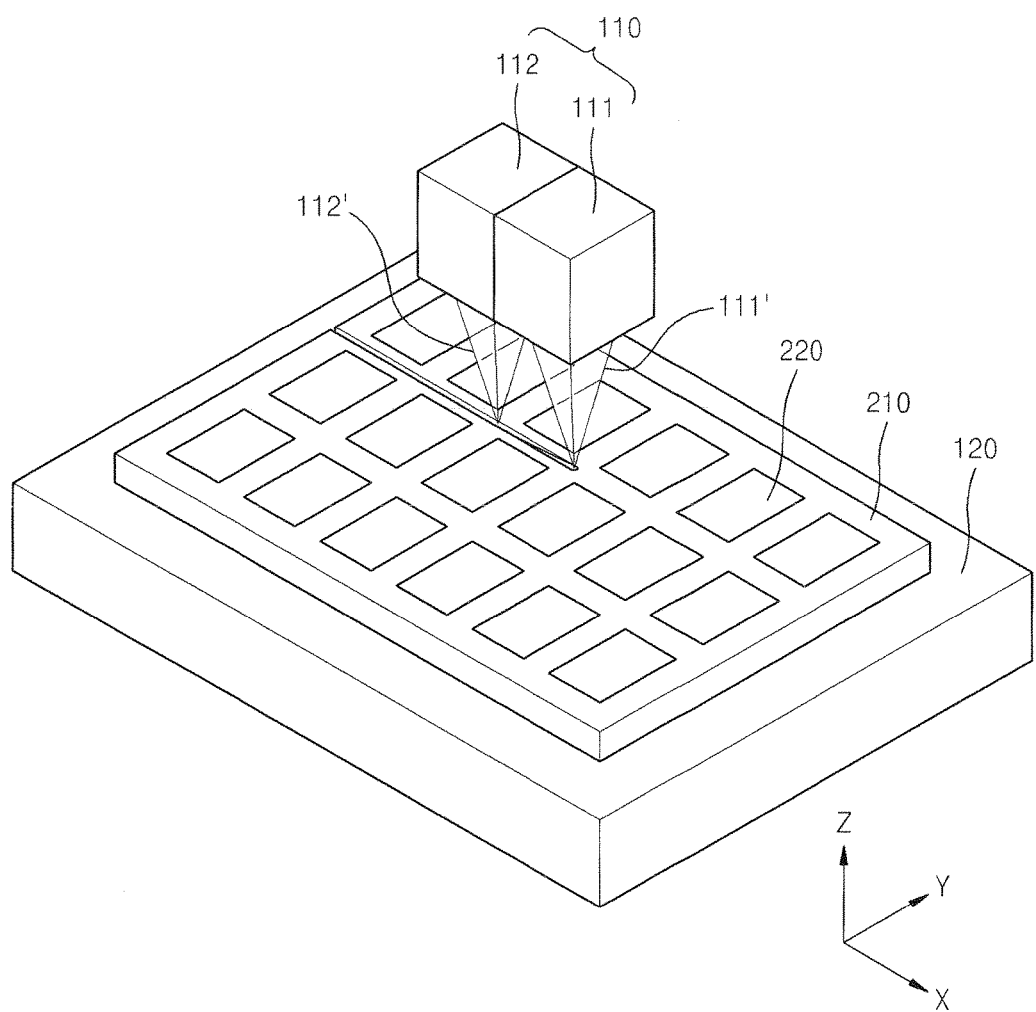
FIG. 1 is an exploded perspective view of an example in which a substrate is cut by using a substrate cutting apparatus according to an embodiment of the present invention.

Reference will now be made in detail to embodiments, examples of which are illustrated in the accompanying drawings. In this regard, the present embodiments may have different forms and should not be construed as being limited to the descriptions set forth herein. Accordingly, the embodiments are merely described below, by referring to the figures, to explain aspects of the present description.

In the accompanying drawings, those components that are the same or are in correspondence are rendered the same reference numeral regardless of the figure number, and redundant explanations are omitted.

Throughout the specification, it will be understood that when a layer, a film, a region, a plate, or the like is referred to as being "on" another layer, film, region, or plate, the layer, film, region, or plate can be directly on another layer, film, region, or plate or an intervening layer, film, region, or plate may also be present. In contrast, when an element is referred to as being "directly on," "directly connected to" or "directly coupled to" another element or layer, there are no intervening elements or layers present. Like or similar reference numerals refer to like or similar elements throughout. As used herein, the term "and/or" includes any and all combinations of one or more of the associated listed items. In the drawings, for convenience of description, the thicknesses or sizes of elements are exaggerated for clarity, but one or more embodiments of the present invention are not limited thereto.

Throughout the specification, an X-axis, a Y-axis, and a Z-axis are not limited to three axes on a rectangular coordinate system, and may be interpreted as broader concepts. For example, the X, Y, and Z-axes may cross each other but may indicate different directions that do not cross each other.

As used herein, the term "and/or" includes any and all combinations of one or more of the associated listed items. Expressions such as "at least one of," when preceding a list of elements, modify the entire list of elements and do not modify the individual elements of the list.

It will be understood that, although the terms first, second, third etc. may be used herein to describe various elements, components, regions, layers, patterns and/or sections, these elements, components, regions, layers, patterns and/or sections should not be limited by these terms. These terms are only used to distinguish one element, component, region, layer pattern or section from another region, layer, pattern or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross sectional illustrations that are schematic illustrations of illustratively idealized example embodiments (and intermediate structures) of the inventive concept. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. The regions illustrated in the figures are schematic in nature and their shapes are not intended to illustrate the actual shape of a region of a device and are not intended to limit the scope of the inventive concept.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is an exploded perspective view of an example in which a substrate is cut by using a substrate cutting apparatus according to an embodiment of the present invention. Referring to FIG. 1, the substrate cutting apparatus includes a laser beam oscillator 110, a stage 120, and a transfer unit (not shown).

A laser beam oscillator 110 is an integrated laser beam oscillator where an infrared wavelength laser beam oscillator 111 and a short pulse laser beam oscillator 112 are adjacent to each other and are fixed. Here, the fact that the infrared wavelength laser beam oscillator 111 and the short pulse laser beam oscillator 112 are adjacent to each other and are fixed may mean that the infrared wavelength laser beam oscillator 111 and the short pulse laser beam oscillator 112 may contact each other as shown in FIG. 1 or may mean that, although the infrared wavelength laser beam oscillator 111 and the short pulse laser beam oscillator 112 are separated from each other, they are located adjacent to each other and a distance therebetween is fixed.

A substrate 210 that is a target object to be processed may be disposed on the stage 120. A plurality of display units 220 may be formed on the substrate 210. The display units 220 may be organic light-emitting display units or liquid crystal display units. Although not illustrated in FIG. 1, the substrate 210 may be fixed on the stage 120 by using a clamp (not shown) so that a position of the substrate 210 does not change on the stage 120.

The transfer unit may transfer at least one of the laser beam oscillator 110 and the stage 120. In more detail, the transfer unit may transfer at least one of the laser beam oscillator 110 and the stage 120, so that an infrared wavelength laser beam 111' that is emitted from the laser beam oscillator 110 may be irradiated on a region, and then a short pulse laser beam 112' may be irradiated on the region.

In the example shown in FIG. 1, while a position of the laser beam oscillator 110 is fixed, the transfer unit may transfer the stage 120 in a negative (−) X-axis direction. In this case, when the substrate 210 on the stage 120 is transferred, the substrate 210 first passes a space under the infrared wavelength laser beam oscillator 111 and then passes a space under the short pulse laser beam oscillator 112. Accordingly, the infrared wavelength laser beam 111' that is emitted from the infrared wavelength laser beam oscillator 111 is first irradiated on regions between the display units 220 on the substrate 210, and then the short pulse laser beam 112' that is emitted from the short pulse laser beam oscillator 112 is irradiated on the regions of the substrate 210, on which the infrared wavelength laser beam 111' has just been irradiated. Obviously, the transfer unit may transfer the stage 120 not only in the negative X-axis direction but also may transfer the stage 120 in a positive (+) X-axis direction, a negative (−) Y-axis direction, and/or a positive (+) Y-axis direction, or may rotate the stage 120, and thus may adjust a position of the stage 120.

Alternatively, in the example shown in FIG. 1, while the position of the stage 120 is fixed, the transfer unit may transfer the laser beam oscillator 110 in the positive X-axis direction. In this case, when the laser beam oscillator 110 is transferred in the positive X-axis direction, the infrared wavelength laser beam oscillator 111 first passes a space above the substrate 210, and then the short pulse laser beam oscillator 112 passes the space above the substrate 210. Accordingly, the infrared wavelength laser beam 111' that is emitted from the infrared wavelength laser beam oscillator 111 is first irradiated on regions between the display units 220 on the substrate 210, and then the short pulse laser beam 112' that is emitted from the short pulse laser beam oscillator 112 is irradiated on the regions of the substrate 210, on which the infrared wavelength laser beam 111' has just been irradiated. Obviously, the transfer unit may transfer the laser beam oscillator 110 not only in the positive X-axis direction but also may transfer the laser beam oscillator 110 in the negative X-axis direction, the positive Y-axis direction, and/or the negative Y-axis direction, or may rotate the laser beam oscillator 110, and thus may adjust a position of the laser beam oscillator 110.

In another embodiment, the transfer unit may include a first transfer unit for transferring the laser beam oscillator 110, and a second transfer unit for transferring the stage 120, wherein the first transfer unit may transfer the laser beam oscillator 110 in the positive X-axis direction, and the second transfer unit may transfer the stage 120 in the negative X-axis direction.

By using the substrate cutting apparatus according to the present embodiment, the infrared wavelength laser beam oscillator 111 first irradiates the infrared wavelength laser beam 111' on the substrate 210 and thus removes a portion of the substrate 210, and then the short pulse laser beam oscillator 112 irradiates the short pulse laser beam 112' on a region of the substrate 210 on which the infrared wavelength laser beam 111' has just been irradiated, and thus removes the region of the substrate 210, so that the substrate 210 may be effectively cut.

In particular, although the substrate 210 is not formed of a single material but has a multi-layer structure formed of different materials, the substrate 210 that has the multi-layer structure may be efficiently and exactly cut by using the integrated laser beam oscillator 110 having the infrared wavelength laser beam oscillator 111 and the short pulse laser beam oscillator 112 that are located adjacent to each other. For example, one layer in the multi-layer structure may be removed by using a laser beam emitted from the infrared wavelength laser beam oscillator 111, and then another layer other than the layer in the multi-layer structure may be removed by using a laser beam emitted from the short pulse laser beam oscillator 112, so that the multi-layer structure may be efficiently and exactly cut.

The infrared wavelength laser beam oscillator 111 may include a carbon dioxide laser beam oscillator capable of emitting a laser beam with approximately a 15 µs pulse and a wavelength between 9 µm and 10 µm. The short pulse laser beam oscillator 112 may include a femtosecond laser beam oscillator capable of emitting a laser beam with a 750 fs pulse and a wavelength of approximately 1030 nm, or a picosecond laser beam oscillator capable of emitting a laser beam with a 10 ps pulse and a wavelength of approximately 515 nm.

Figure 2:
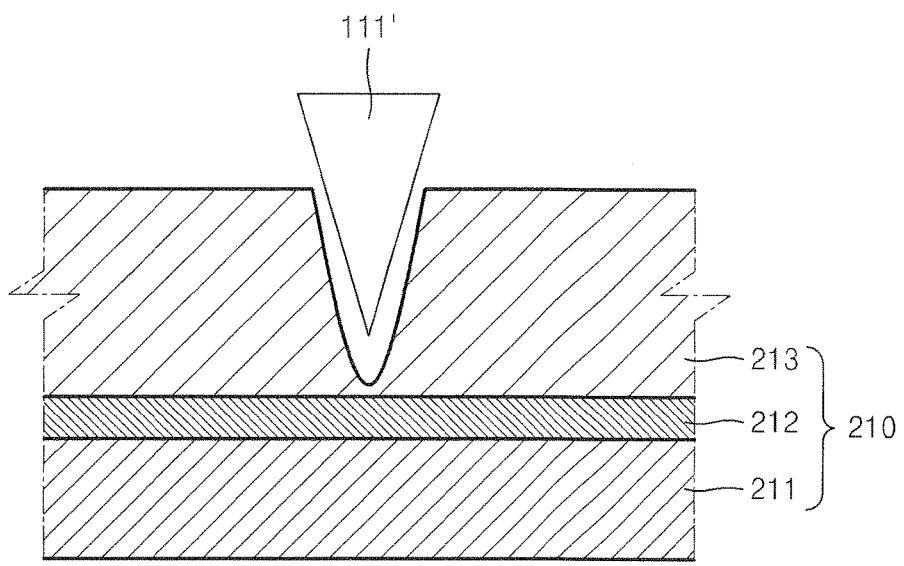
FIGS. 2 and 3 are cross-sectional views illustrating a process of cutting the substrate by using the substrate cutting apparatus of FIG. 1.
Figure 3:
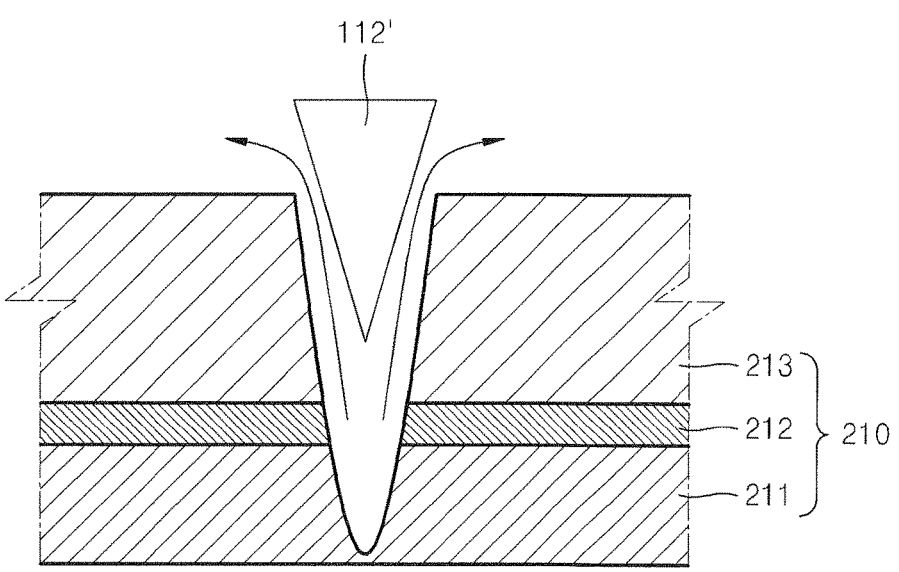

FIGS. 2 and 3 are cross-sectional views illustrating a process of cutting the substrate 210 by using the substrate cutting apparatus of FIG. 1. The substrate 210 that is supported by the stage 120 may be a stack including a first layer 211, a second layer 212, and a third layer 213, as shown in FIGS. 2 and 3. Here, the first layer 211 and the third layer 213 may include polyethylene terephthalate, and the second layer 212 between the first layer 211 and the third layer 213 may include polyimide. In this case, one of the first layer 211 and the third layer 213 may be removed by using a laser beam emitted from the infrared wavelength laser beam oscillator 111, and then the second layer 212 and the other one of the first layer 211 and the third layer 213 may be removed by using a laser beam emitted from the short pulse laser beam oscillator 112, so that the substrate 210 may be cut.

For example, as illustrated in FIG. 2, the third layer 213 of the substrate 210 may be removed by using the laser beam emitted from the infrared wavelength laser beam oscillator 111, and then, as illustrated in FIG. 3, the second layer 212 and the first layer 211 may be removed by using the laser beam emitted from the short pulse laser beam oscillator 112, so that the substrate 210 may be cut.

Obviously, the substrate 210 may be cut by using only the short pulse laser beam oscillator 112. However, in a case where a short pulse laser beam is irradiated on the substrate 210, including the first through third layers 211 through 213, by using only the short pulse laser beam oscillator 112, when the short pulse laser beam removes the third layer 213, a portion of the short pulse laser beam passes through the third layer 213 and reaches the second layer 212 before the third layer 213 is completely removed. Due to that, the second layer 212 starts being removed before the third layer 213 is completely removed, and while the second layer 212 is removed, a fume may occur at an interface between the second layer 212 and the third layer 213, which may cause an error by contaminating the substrate 210.

However, by using the substrate cutting apparatus according to the present embodiment, the third layer 213 of the substrate 210 is first removed by using the laser beam emitted from the infrared wavelength laser beam oscillator 111, and polyethylene terephthalate included in the third layer 213 significantly absorbs the infrared wavelength laser beam. Thus, when the third layer 213 of the substrate 210 is removed by using the laser beam emitted from the infrared wavelength laser beam oscillator 111, the infrared wavelength laser beam is mainly absorbed by the third layer 213 and does not reach the second layer 212. Accordingly, while the third layer 213 is removed, it is possible to effectively prevent or to significantly decrease the chance that the second layer 212 starts being removed before the third layer 213 is completely removed, and thus, the occurrence of a fume may be prevented or significantly decreased.

Also, a fume that occurs when the second layer 212 of the substrate 210 is removed by using the laser beam emitted from the short pulse laser beam oscillator 112 may be externally discharged via a region of the third layer 213, which has been removed, so that an error due to the fume may be prevented or significantly decreased.

As described above, the third layer 213 is removed by using the infrared wavelength laser beam, and then the second layer 212 and the first layer 211 are removed by using the laser beam emitted from the short pulse laser beam oscillator 112, so that the substrate 210 may be efficiently and exactly cut.

Alternatively, the substrate 210 may be cut by using only the infrared wavelength laser beam oscillator 111. However, when the infrared wavelength laser beam is irradiated on the substrate 210, including the first through third layers 211 through 213, by using only the infrared wavelength laser beam oscillator 111, it is difficult for the infrared wavelength laser beam to rapidly and effectively remove the second layer 212 including polyimide, which may thus deteriorate the efficiency and speed in cutting the substrate 210.

However, by using the substrate cutting apparatus according to the present embodiment, the third layer 213 is removed, and then the second layer 212 and the first layer 211 are removed by using the short pulse laser beam emitted from the short pulse laser beam oscillator 112. In this regard, since polyimide has a high absorption factor regarding the short pulse laser beam, the second layer 212 of polyimide may be rapidly removed.

As illustrated in FIG. 3, the substrate 210 that is cut by the substrate cutting apparatus according to the present embodiment may include the first through third layers 211 through 213, wherein the first layer 211 and the third layer 213 may include polyethylene terephthalate, and the second layer 212 between the first layer 211 and the third layer 213 may include polyimide. In this case, since the third layer 213, including polyethylene terephthalate, is removed by the infrared wavelength laser beam 111' that is emitted from the infrared wavelength laser beam oscillator 111 and an absorption coefficient of polyethylene terephthalate with respect to the infrared wavelength laser beam 111' is significantly high, the third layer 213 may be effectively removed.

However, since the first layer 211 is not removed by the infrared wavelength laser beam 111' but is removed by the short pulse laser beam 112' emitted from the short pulse laser beam oscillator 112, the removal efficiency by the short pulse laser beam 112' may be lower than the removal efficiency by the infrared wavelength laser beam 111'. Thus, as illustrated in FIGS. 2 and 3, a thickness of the first layer 211 that is removed by the short pulse laser beam oscillator 112 may be smaller than a thickness of the third layer 213 that is removed by the infrared wavelength laser beam oscillator 111.

In this case, referring to FIGS. 1 through 3, the display unit 220 is formed on the third layer 213 that has a thickness greater than the thickness of the first layer 211, and the infrared wavelength laser beam that is emitted from the infrared wavelength laser beam oscillator 111 of the integrated laser beam oscillator 110 reaches the third layer 213, but one or more embodiments of the present invention are not limited thereto. For example, the display unit 220 may be formed on the first layer 211, and the infrared wavelength laser beam that is emitted from the infrared wavelength laser beam oscillator 111 of the integrated laser beam oscillator 110 may reach the third layer 213. In this case, the display unit 220 on the substrate 210 may face the stage 120, unlike to that shown in FIG. 1.

Alternatively, the display unit 220 may be formed on the first layer 211, the substrate 210 may be mounted on the stage 120 so as to control the third layer 213 to face the stage 120, and the integrated laser beam oscillator 110 may be positioned below the stage 120, so that the infrared wavelength laser beam that is emitted from the infrared wavelength laser beam oscillator 111 of the integrated laser beam oscillator 110 may pass through the stage 120 and thus may be irradiated on the third layer 213 of the substrate 210. In this case, the stage 120 may include a light-transmitting material.

The substrate cutting apparatus is described above but one or more embodiments of the present invention are not limited thereto. For example, a method of manufacturing a display apparatus by using the substrate cutting apparatus is also an embodiment of the present invention.

The method of manufacturing a display apparatus by using the substrate cutting apparatus according to the present embodiment may include an operation of forming the display unit 220 by forming a display device on the substrate 210 and operations of irradiating a laser beam on the substrate 210 and then cutting the substrate 210. Here, the operation of cutting the substrate 210 may include an operation of irradiating the infrared wavelength laser beam 111' on the substrate 210 and an operation of irradiating the short pulse laser beam 112' on a region of the substrate 210, on which the infrared wavelength laser beam 111' was just irradiated.

According to the method of manufacturing a display apparatus according to the present embodiment, first, the infrared wavelength laser beam 111' is irradiated on the substrate 210 and thus removes a portion of the substrate 210, and afterward, the short pulse laser beam 112' is irradiated on a region of the substrate 210, on which the infrared wavelength laser beam 111' has just been irradiated, and thus removes the region of the substrate 210, so that the substrate 210 is effectively cut and thus a yield of manufacture of the display apparatus may be significantly increased.

In particular, although the substrate 210 is not formed of a single material but has a multi-layer structure formed of different materials, since the short pulse laser beam 112' is irradiated right after the infrared wavelength laser beam 111' is irradiated, a cutting operation may be efficiently and exactly performed on the multi-layer structure. For example, one layer in the multi-layer structure of the substrate 210 may be removed by using the infrared wavelength laser beam 111', and then another layer other than the layer in the multi-layer structure of the substrate 210 may be removed by using the short pulse laser beam 112', so that the substrate 210 that has the multi-layer structure may be efficiently and exactly cut.

A carbon dioxide laser beam with approximately a 15 µs pulse and a wavelength between 9 µm and 10 µm that is emitted from a carbon dioxide laser beam oscillator may be used as the infrared wavelength laser beam 111'. A laser beam with a 750 fs pulse and a wavelength of approximately 1030 nm that is emitted from a femtosecond laser beam oscillator, or a laser beam with a 10 ps pulse and a wavelength of approximately 515 nm that is emitted from a picosecond laser beam oscillator may be used as the short pulse laser beam 112'.

As described above, according to the method of manufacturing a display apparatus, according to the present embodiment, in the operation of cutting the substrate 210, as shown in FIG. 1, the integrated laser beam oscillator 110 having the infrared wavelength laser beam oscillator 111 and the short pulse laser beam oscillator 112 that are adjacent to each other may be used.

Also, the operation of forming the display device may correspond to an operation of forming the display device on the substrate 210 that is a stack including the first layer 211 and the third layer 213 that include polyethylene terephthalate, and the second layer 212 that includes polyimide and is between the first layer 211 and the third layer 213. In this case, in the operation of irradiating the infrared wavelength laser beam 111', the infrared wavelength laser beam 111' is irradiated on at least one of the first layer 211 and the third layer 213 of the substrate 210 and thus one of the first layer 211 and the third layer 213 is removed, and in the operation of irradiating the short pulse laser beam 112', the short pulse laser beam 112' is irradiated on the second layer 212 and the other one of the first layer 211 and the third layer 213, and thus the second layer 212 and the other one of the first layer 211 and the third layer 213 are removed.

For example, as illustrated in FIG. 2, the third layer 213 of the substrate 210 is removed by using the infrared wavelength laser beam 111', and then as illustrated in FIG. 3, the second layer 212 and the first layer 211 are removed by using the short pulse laser beam 112', so that the substrate 210 is cut and thus the display apparatus may be manufactured.

Obviously, the substrate 210 may be cut by using only the short pulse laser beam 112'. However, in a case where only the short pulse laser beam 112' is irradiated on the substrate 210, including the first through third layers 211 through 213, when the short pulse laser beam 112' removes the third layer 213, a portion of the short pulse laser beam 112' passes through the third layer 213 and reaches the second layer 212 before the third layer 213 is completely removed. Due to that, the second layer 212 starts being removed before the third layer 213 is completely removed, and while the second layer 212 is removed, a fume may occur at an interface between the second layer 212 and the third layer 213, which may thus cause an error by contaminating the substrate 210.

However, the method of manufacturing a display apparatus, according to the present embodiment, first removes the third layer 213 of the substrate 210 by using the infrared wavelength laser beam 111', and in this regard, polyethylene terephthalate included in the third layer 213 significantly absorbs the infrared wavelength laser beam 111'. Thus, when the third layer 213 of the substrate 210 is removed by using the infrared wavelength laser beam 111', the infrared wavelength laser beam 111' is mainly absorbed by the third layer 213 and does not reach the second layer 212. Accordingly, while the third layer 213 is removed, it is possible to effectively prevent or to significantly decrease the chance that the second layer 212 starts being removed before the third layer 213 is completely removed, and thus, the occurrence of a fume may be prevented or significantly decreased.

Also, a fume that occurs when the second layer 212 of the substrate 210 is removed by using the short pulse laser beam 112' may be externally discharged via a region of the third layer 213, which has been removed, so that an error due to the fume may be prevented or significantly decreased.

As described above, the third layer 213 is removed by using the infrared wavelength laser beam 111', and then the second layer 212 and the first layer 211 are removed by using the short pulse laser beam 112', so that the substrate 210 may be efficiently and exactly cut.

Alternatively, the substrate 210 may be cut by using only the infrared wavelength laser beam 112'. However, when only the infrared wavelength laser beam 112' is irradiated on the substrate 210, including the first through third layers 211 through 213, it is difficult for the infrared wavelength laser beam 112' to rapidly and effectively remove the second layer 212 including polyimide, which may thus deteriorate the efficiency and speed in cutting the substrate 210.

However, the method of manufacturing a display apparatus, according to the present embodiment, first removes the third layer 213, and then removes the second layer 212 and the first layer 211. In this regard, since polyimide has a high absorption factor regarding the short pulse laser beam 112', the second layer 212 of polyimide may be rapidly removed.

In addition, as illustrated in FIG. 3, the substrate 210 that is used in the method of manufacturing a display apparatus according to the present embodiment may include the first through third layers 211 through 213, wherein the first layer 211 and the third layer 213 may include polyethylene terephthalate, and the second layer 212 between the first layer 211 and the third layer 213 may include polyimide. In this case, since the third layer 213, including polyethylene terephthalate, is removed by the infrared wavelength laser beam 111', and an absorption coefficient of polyethylene terephthalate with respect to the infrared wavelength laser beam 111' is significantly high, the third layer 213 may be effectively removed.

However, since the first layer 211 is not removed by the infrared wavelength laser beam 111' but is removed by the short pulse laser beam 112', the removal efficiency by the short pulse laser beam 112' may be lower than the removal efficiency by the infrared wavelength laser beam 111'. Thus, as illustrated in FIGS. 2 and 3, a thickness of the first layer 211 that is removed by the short pulse laser beam 112' may be smaller than a thickness of the third layer 213 that is removed by the infrared wavelength laser beam 111'.

In this case, referring to FIGS. 1 through 3, the display unit 220, including the display device, is formed on the third layer 213 that has a thickness greater than the thickness of the first layer 211, and the infrared wavelength laser beam 111' reaches the third layer 213, but one or more embodiments of the present invention are not limited thereto. For example, the display unit 220, including the display device, may be formed on the first layer 211, and the infrared wavelength laser beam 111' may reach the third layer 213. In this case, the display unit 220 on the substrate 210 may face the stage 120, unlike to that shown in FIG. 1.

Alternatively, the display unit 220, including the display device, may be formed on the first layer 211, the substrate 210 may be mounted on the stage 120 so as to control the third layer 213 to face the stage 120, and the infrared wavelength laser beam 111' may pass through the stage 120 and then may be irradiated on the third layer 213 of the substrate 210. In this case, the stage 120 may include a light-transmitting material. Obviously, the short pulse laser beam 112' may pass through the stage 120 and then may be irradiated on the second layer 212 and the first layer 211 of the substrate 210.

As described above, the method of manufacturing a display apparatus, according to the present embodiment, may include an operation of forming the display units 220 by forming display devices in a plurality of display regions on the substrate 210, as shown in FIG. 1, and an operation of cutting the substrate 210 by irradiating a laser beam on the substrate 210, the laser beam may be irradiated on regions between the display units 220 of the substrate 210 so that the substrate 210 may be cut.

As described above, according to the one or more of the above embodiments of the present invention, the substrate cutting apparatus and the method of manufacturing the display apparatus by using the substrate cutting apparatus are provided, whereby an occurrence of an error in cutting the substrate may be prevented and the substrate may be exactly cut.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims.

What is claimed is:

1. A method of manufacturing a display apparatus, the method comprising:
cutting a substrate by irradiating the substrate with a laser beam, the substrate comprising a first plurality of layers and a second plurality of layers, and a plurality of display units for displaying images,
wherein the cutting the substrate comprises:
irradiating a region of the substrate with an infrared wavelength laser beam to cut the first plurality of layers; and
irradiating the region of the substrate with a short pulse laser beam after the complete cut of the first plurality of layers, the short pulse laser beam having a visible wavelength of approximately 515 nm with a pulse in a picosecond range, to cut the second plurality of layers.

2. The method of claim 1, wherein the cutting is performed by using an integrated laser beam oscillator that includes an infrared wavelength laser beam oscillator and a short pulse laser beam oscillator that is disposed adjacent to the infrared wavelength laser beam oscillator.

3. The method of claim 1, wherein the infrared wavelength laser beam is emitted by a carbon dioxide laser beam oscillator.

4. The method of claim 1, wherein the substrate is a stack comprising a first layer, a second layer, and a third layer, wherein the first layer and the third layer are made of a same material and the second layer is made of a different material from that of the first and third layers, and wherein the second layer is disposed between the first layer and the third layer.

5. The method of claim 4, wherein the first layer and the third layer comprise polyethylene terephthalate, and the second layer comprises polyimide and is positioned between the first layer and the third layer.

6. The method of claim 4, wherein irradiating a region of the substrate with an infrared wavelength laser beam comprises irradiating one of the first layer and the third layer of the substrate with the infrared wavelength laser beam, and irradiating the region of the substrate with a short pulse laser beam comprises irradiating the second layer and the other of the first layer and the third layer with the short pulse laser beam.

7. The method of claim 1, wherein the region of the substrate is a region between the display units.

8. A method of cutting a substrate including a plurality of display units for displaying images, the substrate includes a stacked structure having a first layer, a second layer in direct contact with the first layer and a third layer in direct contact with the second layer, the first and the third layers are made of a same material and the second layer is made of a different material from that of the first and third layers, the method of cutting the substrate comprising:
irradiating a region of the substrate with an infrared wavelength laser beam to cut the third layer of the region of the substrate; and
irradiating the region of the substrate with a short pulse laser beam to cut the second and first layers of the region of the substrate after the complete cut of the third layer of the region of the substrate, the short pulse laser beam having a visible wavelength of approximately 515 nm with a pulse in a picosecond range.

9. The method of claim 8, wherein the infrared wavelength laser beam is generated by an infrared wavelength laser beam oscillator, and the short pulse laser beam is generated by a short pulse laser beam oscillator, the infrared wavelength laser beam oscillator is disposed adjacent to the short pulse laser beam oscillator in a fixed position.

10. The method of claim 8, wherein the infrared wavelength laser beam is emitted by a carbon dioxide laser beam.

11. The method of claim 8, wherein the first layer and the third layer comprise polyethylene terephthalate, and the second layer comprises polyimide and is positioned between the first layer and the third layer.

12. The method of claim 8, wherein the region of the substrate is a region between the display units.

13. A method of cutting a substrate including a first layer and a second layer, the method comprising:
irradiating a portion of the first layer with a first type of laser beam and removing the irradiated portion of the first layer; and
irradiating a portion of the second layer with a second type of laser beam and removing the irradiated portion of the second layer after the complete cut of the first layer;
wherein the first type of laser beam has an infrared wavelength and the second type of laser beam has a visible wavelength with a picosecond pulse, and
wherein the visible wavelength with the picoseconds pulse is colored green in a predominant wavelength between 495 nm and 570 nm.

14. The method of claim 13, wherein the second layer includes polyimide.

15. The method of claim 13, wherein the first layer and second layer are disposed in a different cutting side of the display panel.

* * * * *